(No Model.) 2 Sheets—Sheet 1.
C. L. BARD.
WHIP SOCKET.
No. 318,531. Patented May 26, 1885.
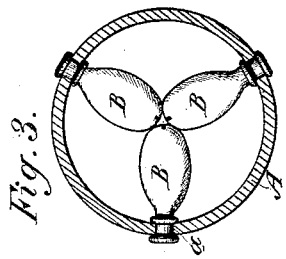
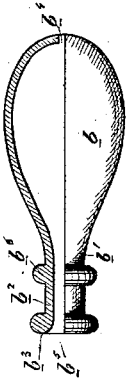
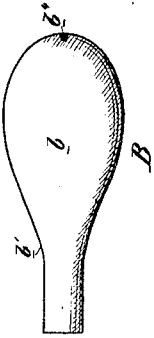
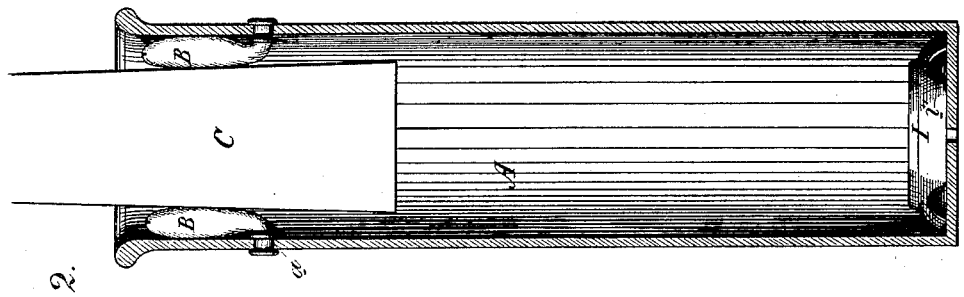
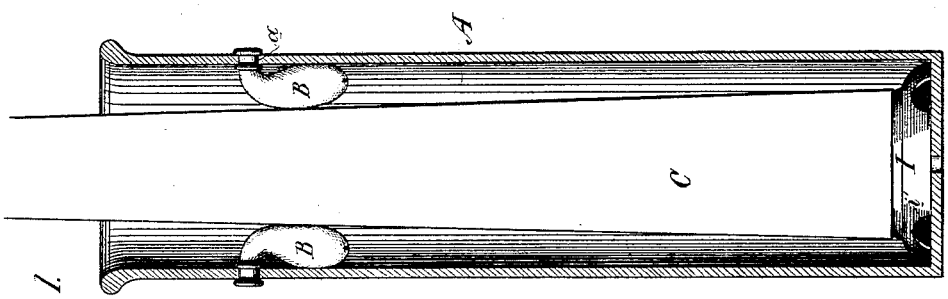
Witnesses;
Geo. H. Strong.
J. L. Rourke.
Inventor,
C. L. Bard
By Dewey & Co.
Attorneys (No Model.) 2 Sheets—Sheet 2.
C. L. BARD.
WHIP SOCKET.
No. 318,531. Patented May 26, 1885.
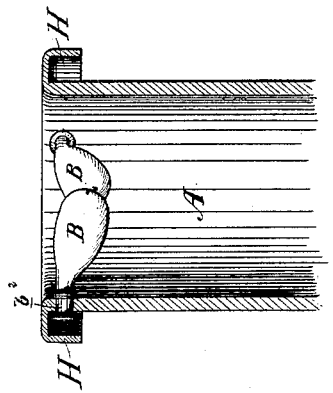
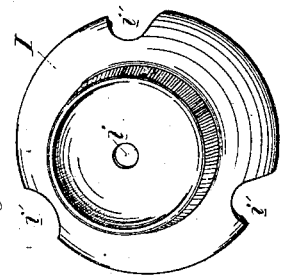
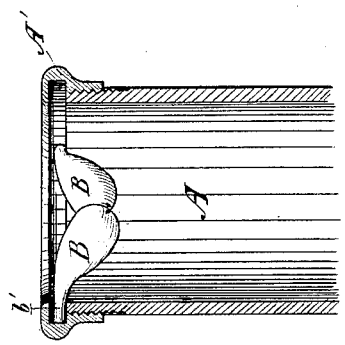
Witnesses,
Geo. H. Strong.
Inventor,
C. L. Bard
By Dewey & Co.
Attorneys

UNITED STATES PATENT OFFICE.

CEPHAS L. BARD, OF SAN BUENAVENTURA, CALIFORNIA.

WHIP-SOCKET.

SPECIFICATION forming part of Letters Patent No. 318,531, dated May 26, 1885.

Application filed April 1, 1885. (No model.)

*To all whom it may concern:*

Be it known that I, CEPHAS L. BARD, of San Buenaventura, county of Ventura, and State of California, have invented an Improvement in Whip-Sockets; and I hereby declare the following to be a full, clear, and exact description thereof.

My invention relates to a new and useful whip-socket; and it consists in one or more air bulbs or cushions projecting within the barrel of the socket and adapted to bind upon the stock of the whip, and in a peculiar bearing-plate for the bottom of the socket.

It consists, further, in details relating to the construction, the arrangement, and the manner of seating the air-bulbs, all of which I shall hereinafter fully explain by reference to the accompanying drawings, in which—

Figure 1 is a vertical section of my whip-socket, showing the whip in position. Fig. 2 is a section of same, showing the position which the bulbs assume upon the forcible withdrawal of the whip to release it from undue binding. Fig. 3 is a part sectional and elevational view of one of the bulbs when free. Fig. 4 is a perspective view of one of the bulbs. Fig. 5 is a modification of same. Fig. 6 is a vertical section of the whip-socket, showing a modification in the manner of securing the bulbs. Fig. 7 is a modification showing the manner in which the mouths of the bulbs may be protected from rain and dust. Fig. 8 is a perspective view of the bearing-plate in the base of the socket.

The object of my invention is to provide a whip-socket having simple and effective means for steadying and holding the whip-stock, and supporting its butt to an advantage free from rain-drippings.

A is the barrel of the socket, made of any suitable form and material, and of one or more pieces, as may be desirable. Through the walls of the barrel, near its top, or at any other portion, are made circular apertures $a$, which may or may not have eyelets for the protection of the air-bulbs.

B are air-bulbs, made of any suitable material—such as leather, oil-skin, or fabric of any kind impervious to air—though they are preferably made of rubber for the reason that the elastic nature of the material adds to the expansibility of the bulb. These bulbs may be made as shown in Fig. 4, having an enlarged body portion, $b$, a neck, $b'$, and a head, $b^2$, provided with an external flange, $b^3$. The bulb may be (and should be when made of non-elastic material) air-tight, though when made of rubber or other elastic material it may have the end or apex of its body pierced, forming an aperture, $b^4$, and its head may have an open mouth, $b^5$, whereby the air may escape and re-enter from either end. The bulbs B, one or more in number, (here shown as three,) are crowded through the apertures $a$ of the barrels until their bodies project within, as shown in Fig. 3, being held in this position by reason of their flanged heads engaging the rim of the apertures, which prevent any inward displacement, while their enlarged conical bodies prevent any outward displacement, and they are therefore firmly seated, a position which is the better preserved when they are made of rubber, because the expansive force thereof assists in securing them.

The whip-stock C is shown in Fig. 1 as inserted. The air-bulbs are therefore carried downward to a pendent position, where they bind upon the whip, serving as wedges or cushions.

In an air-tight bulb the compression of the air produces this binding effect, but in an elastic bulb the nature of the material assists this effect and works the more easily by reason of the ready escape of the air through the aperture $b^4$, or through the mouth of the bulb, and thus always preserving a cushion sufficient to clamp the whip, no matter of what diameter. When the whip is removed, the bulbs become inflated and are ready again to receive the whip. If they should bind the whip too tightly, (as where the stock has become ragged or frayed,) a greater force exerted to withdraw it would raise the bulbs to the position shown in Fig. 2, and thus free the whip; and to prevent any uncertainty in their action in such a case I could enlarge the barrel about the seat of the bulbs, and with such enlargement could use larger bulbs. A flange, $b^6$, may encircle the neck of the bulb about on a line where it joins the body. The engagement of this flange with the inner wall of the barrel would serve to hold the bulb from being forced outwardly just as the flange $b^3$ prevents an inward displacement.

A modification of the bulb is shown in Fig. 5, where the head is dispensed with, a narrow neck alone remaining, thus adapting the bulb to be clamped in other ways, as by an encircling wire or ring. The heads of the bulbs, when in position, may be covered with metal caps or rings for ornaments, and the whole bulb may be covered with a protecting layer or envelope of some soft and durable fabric for the sake of protection, though I do not deem this essential; or the head of the bulb may be made of harder rubber or with thicker walls, or be provided with a protecting-collar, or could even be made of metal. Any of the bulbs may readily be replaced when necessary.

I do not confine myself to the manner of seating the bulbs heretofore described. In Fig. 6 I show them held or clamped between the top of the barrel and the under wall of a screw-cap, A'; nor do I confine myself to the location of the bulbs, as described, as they may be placed in other positions throughout the length of the barrel and in different planes—say one near the top, one near the center, and one near the bottom of the barrel. Moreover I do not wish to confine myself to the shape of the bulbs as described, for I may have their top and bottom provided with extensions, by which they can be suspended loosely within the barrel, their upper extensions being secured near the top of the barrel and their lower extensions near the bottom; nor need the bulbs be separate ones, as I may employ one or more air-bulbs in the shape of rings provided with minute perforations, or left air-tight, and secure them within the barrel in any suitable manner, the main principle of my invention being the employment of air-cushions adapted to bind upon the stock of the whip.

In Fig. 7 I show a means for protecting the mouths of the air-bulbs, which consists in providing a downwardly-turned flange, H, for the top of the barrel, and which may be either a part of the barrel or an independent cap or ring.

In Fig. 8 I show the bottom bearing, I, for the socket. It consists of a piece of suitable material, metal or otherwise, having the shape of a truncated cone, its top being concaved and provided with a small hole, $i$. The rim of its base is cut out in one or more places to form apertures $i'$. This bearing-plate is inserted in the bottom of the barrel, as shown in Figs. 1 and 2. It may be inserted from below, and then soldered or fastened securely; or it can be crowded down from above and allowed to rest on a shoulder on the inner surface of the barrel. The bottom of the barrel remains of the usual formation.

The advantage of the bearing-plate is this: In other sockets the opening for escape of water and dust is just where the butt of the whip rests, and water trickling down the interior wall of the socket must, before escaping, come in contact with the whip-butt. This is not only the case where a simple concave bottom is used, but also where a conical-shaped bottom is present. In my socket, provided with such a plate as I, the whip-butt is protected from water as it trickles down past the rim of the plate through the apertures $i'$, and so escapes without touching the whip-butt. Again, the concave top of the plate prevents the chafing and churning of the whip. In conical-shaped bottoms there is great chafing of the ferrule encircling the base of the whip. This is obviated by the plate I in my socket.

To prevent noise when the whip-butt strikes the concave-plate I, the latter may be made of rubber or covered with a layer of said material or of leather.

Having thus described my invention, what I claim as new, and desire to secure by Letters Patent, is—

1. A whip-socket having one or more air bulbs or cushions adapted to bind upon and hold the whip-stock, substantially as herein described.

2. A whip-socket having one or more elastic air bulbs or cushions in its interior, adapted to bind upon and hold the whip-stock, substantially as herein described.

3. In a whip-socket, one or more air bulbs or cushions, B, having an enlarged body and a neck, by which the bulb is secured to the wall of the barrel, substantially as herein described.

4. In a whip-socket, the combination of the barrel A with an annular series of air bulbs or cushions, B, secured to said barrel and projecting within its interior, substantially as herein described.

5. In a whip-socket, the barrel A, having the apertures $a$, in combination with the air bulbs or cushions B, having enlarged bodies, and necks $b'$, fitting in apertures $a$, whereby said bulbs are adapted to be secured, substantially as herein described.

6. In a whip-socket, the barrel A, having the apertures $a$, in combination with the air bulbs or cushions B, having enlarged bodies $b$, necks $b'$, fitting the apertures $a$, and heads $b^2$, with flanges $b^3$, whereby said bulbs or cushions are held in place, substantially as herein described.

7. In a whip-socket, the barrel A, having the apertures $a$, in combination with the air bulbs or cushions B, having enlarged bodies $b$, necks $b'$, fitting the apertures $a$, heads $b^2$, with flanges $b^3$, engaging the apertures from without, and flanges $b^6$ around the neck engaging the apertures from within, substantially as herein described.

8. In combination with a barrel of a whip-socket, one or more air bulbs or cushions, B, made of some elastic material and provided with air-vents, said bulbs or cushions being secured to the barrel with their bodies projecting into its interior, substantially as and for the purpose herein described.

9. In combination with the barrel A of a whip-socket having apertures $a$, the elastic air bulbs or cushions B, having enlarged bodies $b$, and necks $b'$, fitting and secured within the apertures $a$, said bulbs having an aperture or vent, $b^4$, in the apex of their bodies, substantially as and for the purpose herein described.

10. In a whip-socket, the barrel A, having apertures $a$, in combination with the elastic air bulbs or cushions B, having enlarged bodies $b$, necks $b'$, fitting and secured within the apertures $a$, and open-mouthed heads projecting without, substantially as and for the purpose herein described.

11. In a whip-socket, the barrel A, having apertures $a$, in combination with the elastic air bulbs or cushions B, having enlarged bodies $b$, with an air-vent, $b^4$, necks $b'$, fitting and secured within the apertures $a$, and open-mouthed heads projecting without, substantially as and for the purpose herein described.

12. In a whip-socket, the barrel A, having apertures $a$, in combination with the air bulbs or cushions B, having necks $b'$, of harder or thicker rubber than their bodies, and fitting and secured within the apertures $a$, substantially as and for the purpose herein described.

13. In a whip-socket, the bearing-plate I, in the bottom of the barrel, having the shape of a truncated cone, with a concaved top, substantially as and for the purpose herein described.

14. In combination with the barrel A of a whip-socket, the truncated conical bearing-plate I in its bottom, having a concaved top, and apertures $i'$ in its lower rim, substantially as and for the purpose herein described.

15. The plate I in the bottom of a whip-socket, said plate having the shape of a truncated cone, with a concaved top in which the butt of the whip rests, and having an aperture, $i$, in its top, and apertures $i'$ in its lower rim, substantially as and for the purpose herein described.

In witness whereof I have hereunto set my hand.

CEPHAS L. BARD.

Witnesses:
E. P. FOSTER,
EDWIN TAGGART.